United States Patent
Davis et al.

(10) Patent No.: US 9,479,463 B2
(45) Date of Patent: *Oct. 25, 2016

(54) SYSTEM AND METHOD FOR DATA CENTER SECURITY ENHANCEMENTS LEVERAGING MANAGED SERVER SOCS

(71) Applicant: III Holdings 2, LLC, Wilmington, DE (US)

(72) Inventors: Mark Davis, Austin, TX (US); David Borland, Austin, TX (US); Jason Hobbs, Leander, TX (US); Danny Marquette, Austin, TX (US); Thomas A. Volpe, Austin, TX (US); Ken Goss, Austin, TX (US)

(73) Assignee: III HOLDINGS 2, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,178

(22) Filed: Jul. 17, 2014

(65) Prior Publication Data

US 2015/0074255 A1 Mar. 12, 2015

Related U.S. Application Data

(63) Continuation of application No. 13/475,722, filed on May 18, 2012, now Pat. No. 9,077,654, and a continuation-in-part of application No. 12/794,996, filed on Jun. 7, 2010, now abandoned.

(60) Provisional application No. 61/489,569, filed on May 24, 2011, provisional application No. 61/256,723, filed on Oct. 30, 2009.

(51) Int. Cl.
*G06F 15/16* (2006.01)
*G06F 17/00* (2006.01)
*H04L 12/935* (2013.01)

(Continued)

(52) U.S. Cl.
CPC ........... *H04L 49/3009* (2013.01); *H04L 45/60* (2013.01); *H04L 49/109* (2013.01); *H04L 49/351* (2013.01); *H04L 49/356* (2013.01); *H04L 63/0209* (2013.01); *H04L 63/20* (2013.01); *H04L 63/1416* (2013.01); *H04L 63/1433* (2013.01)

(58) Field of Classification Search
None
See application file for complete search history.

(56) References Cited

U.S. PATENT DOCUMENTS

| 5,451,936 A | 9/1995 | Yang et al. |
| 5,594,908 A | 1/1997 | Hyatt |

(Continued)

FOREIGN PATENT DOCUMENTS

| JP | 2005-223753 | 8/2005 |
| TW | M377621 | 4/2010 |

(Continued)

OTHER PUBLICATIONS

Non-Final Office Action on U.S. Appl. No. 14/106,698, mailed Feb. 12, 2015.

(Continued)

*Primary Examiner* — Fatoumata Traore

(57) ABSTRACT

A data center security system and method are provided that leverage server systems on a chip (SOCs) and/or server fabrics. In more detail, server interconnect fabrics may be leveraged and extended to dramatically improve security within a data center.

18 Claims, 8 Drawing Sheets

(51) Int. Cl.
   *H04L 12/773*  (2013.01)
   *H04L 12/933*  (2013.01)
   *H04L 12/931*  (2013.01)
   *H04L 29/06*   (2006.01)

(56) References Cited

U.S. PATENT DOCUMENTS

| | | |
|---|---|---|
| 5,623,641 A | 4/1997 | Kadoyashiki |
| 5,781,187 A | 7/1998 | Gephardt et al. |
| 5,901,048 A | 5/1999 | Hu |
| 5,908,468 A | 6/1999 | Hartmann |
| 5,968,176 A | 10/1999 | Nessett et al. |
| 5,971,804 A | 10/1999 | Gallagher et al. |
| 6,055,618 A | 4/2000 | Thorson |
| 6,141,214 A | 10/2000 | Ahn |
| 6,181,699 B1 | 1/2001 | Crinion et al. |
| 6,192,414 B1 | 2/2001 | Horn |
| 6,198,741 B1 | 3/2001 | Yoshizawa |
| 6,314,487 B1 | 11/2001 | Hahn et al. |
| 6,314,501 B1 | 11/2001 | Gulick et al. |
| 6,373,841 B1 | 4/2002 | Goh et al. |
| 6,442,137 B1 | 8/2002 | Yu et al. |
| 6,446,192 B1 | 9/2002 | Narasimhan et al. |
| 6,452,809 B1 | 9/2002 | Jackson et al. |
| 6,507,586 B1 | 1/2003 | Satran et al. |
| 6,556,952 B1 | 4/2003 | Magro |
| 6,574,238 B1 | 6/2003 | Thrysoe |
| 6,711,691 B1 | 3/2004 | Howard et al. |
| 6,766,389 B2 | 7/2004 | Hayter et al. |
| 6,813,676 B1 | 11/2004 | Henry et al. |
| 6,816,750 B1 | 11/2004 | Klaas |
| 6,842,430 B1 | 1/2005 | Melnik |
| 6,857,026 B1 | 2/2005 | Cain |
| 6,963,926 B1 | 11/2005 | Robinson |
| 6,963,948 B1 | 11/2005 | Gulick |
| 6,977,939 B2 | 12/2005 | Joy et al. |
| 6,988,170 B2 | 1/2006 | Barroso et al. |
| 6,990,063 B1 | 1/2006 | Lenoski et al. |
| 7,020,695 B1 | 3/2006 | Kundu et al. |
| 7,032,119 B2 | 4/2006 | Fung |
| 7,080,078 B1 | 7/2006 | Slaughter et al. |
| 7,080,283 B1 | 7/2006 | Songer et al. |
| 7,095,738 B1 | 8/2006 | Desanti |
| 7,119,591 B1 | 10/2006 | Lin |
| 7,143,153 B1 | 11/2006 | Black et al. |
| 7,165,120 B1 | 1/2007 | Giles et al. |
| 7,170,315 B2 | 1/2007 | Bakker et al. |
| 7,180,866 B1 | 2/2007 | Chartre |
| 7,203,063 B2 | 4/2007 | Bash et al. |
| 7,257,655 B1 | 8/2007 | Burney et al. |
| 7,263,288 B1 | 8/2007 | Islam |
| 7,274,705 B2 | 9/2007 | Chang et al. |
| 7,278,582 B1 | 10/2007 | Siegel et al. |
| 7,310,319 B2 | 12/2007 | Awsienko et al. |
| 7,325,050 B2 | 1/2008 | O'Connor et al. |
| 7,337,333 B2 | 2/2008 | O'Conner et al. |
| 7,340,777 B1 | 3/2008 | Szor |
| 7,353,362 B2 | 4/2008 | Georgiou et al. |
| 7,382,154 B2 | 6/2008 | Ramos et al. |
| 7,386,888 B2 | 6/2008 | Liang et al. |
| 7,418,534 B2 | 8/2008 | Hayter et al. |
| 7,437,540 B2 | 10/2008 | Paolucci et al. |
| 7,447,147 B2 | 11/2008 | Nguyen et al. |
| 7,447,197 B2 | 11/2008 | Terrell et al. |
| 7,466,712 B2 | 12/2008 | Makishima et al. |
| 7,467,306 B2 | 12/2008 | Cartes et al. |
| 7,467,358 B2 | 12/2008 | Kang et al. |
| 7,502,884 B1 | 3/2009 | Shah et al. |
| 7,519,843 B1 | 4/2009 | Buterbaugh et al. |
| 7,555,666 B2 | 6/2009 | Brundridge et al. |
| 7,583,661 B2 | 9/2009 | Chaudhuri |
| 7,586,841 B2 | 9/2009 | Vasseur |
| 7,596,144 B2 | 9/2009 | Pong |
| 7,599,360 B2 | 10/2009 | Edsall et al. |
| 7,606,225 B2 | 10/2009 | Xie et al. |
| 7,606,245 B2 | 10/2009 | Ma et al. |
| 7,616,646 B1 | 11/2009 | Ma et al. |
| 7,620,057 B1 | 11/2009 | Aloni et al. |
| 7,657,677 B2 | 2/2010 | Huang et al. |
| 7,657,756 B2 | 2/2010 | Hall |
| 7,660,922 B2 | 2/2010 | Harriman |
| 7,664,110 B1 * | 2/2010 | Lovett .................. H04L 49/351 370/392 |
| 7,673,164 B1 | 3/2010 | Agarwal |
| 7,710,936 B2 | 5/2010 | Morales Barroso |
| 7,719,834 B2 | 5/2010 | Miyamoto et al. |
| 7,721,125 B2 | 5/2010 | Fung |
| 7,751,433 B2 | 7/2010 | Dollo et al. |
| 7,760,720 B2 | 7/2010 | Pullela et al. |
| 7,761,687 B2 | 7/2010 | Blumrich et al. |
| 7,783,910 B2 | 8/2010 | Felter et al. |
| 7,791,894 B2 | 9/2010 | Bechtolsheim |
| 7,792,113 B1 | 9/2010 | Foschiano et al. |
| 7,796,399 B2 | 9/2010 | Clayton et al. |
| 7,801,132 B2 | 9/2010 | Ofek et al. |
| 7,802,017 B2 | 9/2010 | Uemura et al. |
| 7,805,575 B1 | 9/2010 | Agarwal et al. |
| 7,831,839 B2 | 11/2010 | Hatakeyama |
| 7,840,703 B2 | 11/2010 | Arimilli et al. |
| 7,865,614 B2 | 1/2011 | Lu et al. |
| 7,925,795 B2 | 4/2011 | Tamir et al. |
| 7,934,005 B2 | 4/2011 | Fascenda |
| 7,970,929 B1 | 6/2011 | Mahalingaiah |
| 7,975,110 B1 | 7/2011 | Spaur et al. |
| 7,991,817 B2 | 8/2011 | Dehon et al. |
| 7,991,922 B2 | 8/2011 | Hayter et al. |
| 7,992,151 B2 | 8/2011 | Warrier et al. |
| 8,019,832 B2 | 9/2011 | De Sousa et al. |
| 8,060,760 B2 | 11/2011 | Shetty et al. |
| 8,060,775 B1 | 11/2011 | Sharma et al. |
| 8,082,400 B1 | 12/2011 | Chang et al. |
| 8,108,508 B1 | 1/2012 | Goh et al. |
| 8,122,269 B2 | 2/2012 | Houlihan et al. |
| 8,132,034 B2 | 3/2012 | Lambert et al. |
| 8,155,113 B1 | 4/2012 | Agarwal |
| 8,156,362 B2 | 4/2012 | Branover et al. |
| 8,165,120 B2 | 4/2012 | Maruccia et al. |
| 8,170,040 B2 | 5/2012 | Konda |
| 8,180,996 B2 | 5/2012 | Fullerton et al. |
| 8,189,612 B2 | 5/2012 | Lemaire et al. |
| 8,194,659 B2 | 6/2012 | Ban |
| 8,199,636 B1 | 6/2012 | Rouyer et al. |
| 8,205,103 B2 | 6/2012 | Kazama et al. |
| 8,379,425 B2 | 2/2013 | Fukuoka et al. |
| 8,397,092 B2 | 3/2013 | Karnowski |
| 8,407,428 B2 | 3/2013 | Cheriton et al. |
| 8,504,791 B2 | 8/2013 | Cheriton et al. |
| RE44,610 E | 11/2013 | Krakirian et al. |
| 8,599,863 B2 | 12/2013 | Davis |
| 8,684,802 B1 | 4/2014 | Gross et al. |
| 8,738,860 B1 | 5/2014 | Griffin et al. |
| 8,745,275 B2 | 6/2014 | Ikeya et al. |
| 8,745,302 B2 | 6/2014 | Davis et al. |
| 8,782,321 B2 | 7/2014 | Harriman et al. |
| 8,812,400 B2 | 8/2014 | Faraboschi et al. |
| 8,824,485 B2 | 9/2014 | Biswas et al. |
| 8,854,831 B2 | 10/2014 | Arnouse |
| 8,903,964 B2 | 12/2014 | Breslin et al. |
| 9,008,079 B2 | 4/2015 | Davis et al. |
| 2001/0046227 A1 | 11/2001 | Matsuhira et al. |
| 2002/0004912 A1 | 1/2002 | Fung |
| 2002/0040391 A1 | 4/2002 | Chaiken et al. |
| 2002/0083352 A1 | 6/2002 | Fujimoto et al. |
| 2002/0097732 A1 | 7/2002 | Worster et al. |
| 2002/0107903 A1 | 8/2002 | Richter et al. |
| 2002/0124128 A1 | 9/2002 | Qiu |
| 2002/0159452 A1 | 10/2002 | Foster et al. |
| 2002/0161917 A1 | 10/2002 | Shapiro et al. |
| 2002/0172205 A1 | 11/2002 | Tagore-Brage et al. |
| 2002/0186656 A1 | 12/2002 | Vu |
| 2002/0194412 A1 | 12/2002 | Bottom |
| 2003/0007493 A1 | 1/2003 | Oi et al. |
| 2003/0033547 A1 | 2/2003 | Larson et al. |
| 2003/0041266 A1 | 2/2003 | Ke et al. |

(56) References Cited

U.S. PATENT DOCUMENTS

| | | |
|---|---|---|
| 2003/0076832 A1 | 4/2003 | Ni |
| 2003/0093255 A1 | 5/2003 | Freyensee et al. |
| 2003/0093624 A1 | 5/2003 | Arimilli et al. |
| 2003/0110262 A1 | 6/2003 | Hasan et al. |
| 2003/0140190 A1 | 7/2003 | Mahony et al. |
| 2003/0158940 A1 | 8/2003 | Leigh |
| 2003/0159083 A1 | 8/2003 | Fukuhara et al. |
| 2003/0172191 A1 | 9/2003 | Williams |
| 2003/0188083 A1 | 10/2003 | Kumar et al. |
| 2003/0193402 A1 | 10/2003 | Post et al. |
| 2003/0202520 A1 | 10/2003 | Witkowski et al. |
| 2003/0231624 A1 | 12/2003 | Alappat et al. |
| 2004/0013113 A1 | 1/2004 | Singh |
| 2004/0017806 A1 | 1/2004 | Yazdy et al. |
| 2004/0017808 A1 | 1/2004 | Forbes et al. |
| 2004/0030938 A1 | 2/2004 | Barr et al. |
| 2004/0068676 A1 | 4/2004 | Larson et al. |
| 2004/0111612 A1 | 6/2004 | Choi et al. |
| 2004/0141521 A1 | 7/2004 | George |
| 2004/0165588 A1 | 8/2004 | Pandya |
| 2004/0210693 A1 | 10/2004 | Zeitler et al. |
| 2004/0215864 A1 | 10/2004 | Arimilli et al. |
| 2004/0215991 A1 | 10/2004 | McAfee et al. |
| 2004/0267486 A1 | 12/2004 | Percer et al. |
| 2005/0015378 A1 | 1/2005 | Gammel et al. |
| 2005/0018604 A1 | 1/2005 | Dropps et al. |
| 2005/0018606 A1 | 1/2005 | Dropps et al. |
| 2005/0018663 A1 | 1/2005 | Dropps et al. |
| 2005/0021606 A1 | 1/2005 | Davies et al. |
| 2005/0030954 A1 | 2/2005 | Dropps et al. |
| 2005/0033742 A1 | 2/2005 | Kamvar et al. |
| 2005/0033890 A1 | 2/2005 | Lee |
| 2005/0044195 A1 | 2/2005 | Westfall |
| 2005/0077921 A1 | 4/2005 | Percer et al. |
| 2005/0105538 A1 | 5/2005 | Perera et al. |
| 2005/0141424 A1* | 6/2005 | Lim .................... H04L 12/5693 370/235 |
| 2005/0228852 A1 | 10/2005 | Santos et al. |
| 2005/0240688 A1 | 10/2005 | Moerman et al. |
| 2006/0002311 A1* | 1/2006 | Iwanaga ............. H04L 12/4675 370/254 |
| 2006/0013218 A1 | 1/2006 | Shore et al. |
| 2006/0029053 A1 | 2/2006 | Roberts et al. |
| 2006/0090025 A1 | 4/2006 | Tufford et al. |
| 2006/0136570 A1 | 6/2006 | Pandya |
| 2006/0140211 A1 | 6/2006 | Huang et al. |
| 2006/0174342 A1 | 8/2006 | Zaheer et al. |
| 2006/0179241 A1* | 8/2006 | Clark .................. G06F 12/0817 711/141 |
| 2006/0236371 A1* | 10/2006 | Fish ........................ G06F 21/74 726/2 |
| 2006/0248359 A1 | 11/2006 | Fung |
| 2006/0259734 A1 | 11/2006 | Sheu et al. |
| 2006/0265609 A1 | 11/2006 | Fung |
| 2007/0006001 A1 | 1/2007 | Isobe et al. |
| 2007/0076653 A1 | 4/2007 | Park et al. |
| 2007/0094486 A1 | 4/2007 | Moore et al. |
| 2007/0109968 A1 | 5/2007 | Hussain et al. |
| 2007/0130397 A1 | 6/2007 | Tsu |
| 2007/0174390 A1 | 7/2007 | Silvain et al. |
| 2007/0180310 A1 | 8/2007 | Johnson et al. |
| 2007/0209072 A1* | 9/2007 | Chen ...................... G06F 21/10 726/16 |
| 2007/0226795 A1 | 9/2007 | Conti et al. |
| 2007/0280230 A1 | 12/2007 | Park |
| 2007/0286009 A1 | 12/2007 | Norman |
| 2007/0288585 A1 | 12/2007 | Sekiguchi et al. |
| 2008/0013453 A1 | 1/2008 | Chiang et al. |
| 2008/0040463 A1 | 2/2008 | Brown et al. |
| 2008/0052437 A1 | 2/2008 | Loffink et al. |
| 2008/0059782 A1 | 3/2008 | Kruse et al. |
| 2008/0075089 A1 | 3/2008 | Evans et al. |
| 2008/0089358 A1 | 4/2008 | Basso et al. |
| 2008/0104264 A1 | 5/2008 | Duerk et al. |
| 2008/0140771 A1 | 6/2008 | Vass et al. |
| 2008/0140930 A1 | 6/2008 | Hotchkiss |
| 2008/0159745 A1 | 7/2008 | Segal |
| 2008/0162691 A1 | 7/2008 | Zhang et al. |
| 2008/0183882 A1 | 7/2008 | Flynn et al. |
| 2008/0186965 A1 | 8/2008 | Zheng et al. |
| 2008/0199133 A1 | 8/2008 | Takizawa et al. |
| 2008/0212273 A1 | 9/2008 | Bechtolsheim |
| 2008/0212276 A1 | 9/2008 | Bottom et al. |
| 2008/0217021 A1 | 9/2008 | Lembcke et al. |
| 2008/0222434 A1 | 9/2008 | Shimizu et al. |
| 2008/0235443 A1 | 9/2008 | Chow et al. |
| 2008/0239649 A1 | 10/2008 | Bradicich et al. |
| 2008/0243634 A1 | 10/2008 | Dworkin et al. |
| 2008/0250181 A1 | 10/2008 | Li et al. |
| 2008/0259555 A1 | 10/2008 | Bechtolsheim et al. |
| 2008/0259788 A1 | 10/2008 | Wang et al. |
| 2008/0266793 A1 | 10/2008 | Lee |
| 2008/0270599 A1 | 10/2008 | Tamir et al. |
| 2008/0288660 A1 | 11/2008 | Balasubramanian et al. |
| 2008/0288664 A1 | 11/2008 | Pettey et al. |
| 2008/0288683 A1 | 11/2008 | Ramey |
| 2008/0301794 A1 | 12/2008 | Lee |
| 2008/0313369 A1 | 12/2008 | Verdoorn et al. |
| 2008/0320161 A1 | 12/2008 | Maruccia et al. |
| 2009/0021907 A1 | 1/2009 | Mann et al. |
| 2009/0044036 A1 | 2/2009 | Merkin |
| 2009/0063443 A1 | 3/2009 | Arimilli et al. |
| 2009/0064287 A1 | 3/2009 | Bagepalli et al. |
| 2009/0080428 A1 | 3/2009 | Witkowski et al. |
| 2009/0097200 A1 | 4/2009 | Sharma et al. |
| 2009/0113130 A1 | 4/2009 | He et al. |
| 2009/0133129 A1 | 5/2009 | Jeong et al. |
| 2009/0135751 A1 | 5/2009 | Hodges et al. |
| 2009/0135835 A1 | 5/2009 | Gallatin et al. |
| 2009/0158070 A1 | 6/2009 | Gruendler |
| 2009/0172423 A1 | 7/2009 | Song et al. |
| 2009/0198958 A1 | 8/2009 | Arimilli et al. |
| 2009/0204834 A1 | 8/2009 | Hendin et al. |
| 2009/0204837 A1 | 8/2009 | Raval et al. |
| 2009/0219827 A1 | 9/2009 | Chen et al. |
| 2009/0222884 A1 | 9/2009 | Shaji et al. |
| 2009/0225751 A1 | 9/2009 | Koenck et al. |
| 2009/0235104 A1 | 9/2009 | Fung |
| 2009/0248943 A1 | 10/2009 | Jiang et al. |
| 2009/0251867 A1 | 10/2009 | Sharma et al. |
| 2009/0259863 A1 | 10/2009 | Williams et al. |
| 2009/0259864 A1 | 10/2009 | Li et al. |
| 2009/0265045 A1 | 10/2009 | Coxe, III |
| 2009/0271656 A1 | 10/2009 | Yokota et al. |
| 2009/0276666 A1 | 11/2009 | Haley et al. |
| 2009/0279518 A1 | 11/2009 | Falk et al. |
| 2009/0282274 A1 | 11/2009 | Langgood et al. |
| 2009/0282419 A1 | 11/2009 | Mejdrich et al. |
| 2009/0313390 A1 | 12/2009 | Ahuja et al. |
| 2010/0005331 A1 | 1/2010 | Somasundaram et al. |
| 2010/0008038 A1 | 1/2010 | Coglitore |
| 2010/0008365 A1 | 1/2010 | Porat |
| 2010/0026408 A1 | 2/2010 | Shau |
| 2010/0040053 A1 | 2/2010 | Gottumukkula et al. |
| 2010/0049822 A1 | 2/2010 | Davies et al. |
| 2010/0051391 A1 | 3/2010 | Jahkonen |
| 2010/0106987 A1 | 4/2010 | Lambert et al. |
| 2010/0118880 A1 | 5/2010 | Kunz et al. |
| 2010/0125742 A1 | 5/2010 | Ohtani |
| 2010/0125915 A1 | 5/2010 | Hall et al. |
| 2010/0138481 A1 | 6/2010 | Behrens |
| 2010/0158005 A1 | 6/2010 | Mukhopadhyay |
| 2010/0161909 A1 | 6/2010 | Nation et al. |
| 2010/0165983 A1 | 7/2010 | Aybay et al. |
| 2010/0169479 A1 | 7/2010 | Jeong et al. |
| 2010/0198972 A1 | 8/2010 | Umbehocker |
| 2010/0218194 A1 | 8/2010 | Dallman et al. |
| 2010/0220732 A1 | 9/2010 | Hussain et al. |
| 2010/0250914 A1 | 9/2010 | Abdul et al. |
| 2010/0265650 A1 | 10/2010 | Chen et al. |
| 2010/0281246 A1 | 11/2010 | Bristow et al. |
| 2010/0299548 A1 | 11/2010 | Chadirchi et al. |
| 2010/0308897 A1 | 12/2010 | Evoy et al. |
| 2010/0312910 A1 | 12/2010 | Lin et al. |

(56) References Cited

U.S. PATENT DOCUMENTS

| | | |
|---|---|---|
| 2010/0312969 A1 | 12/2010 | Yamazaki et al. |
| 2010/0318812 A1 | 12/2010 | Auradkar et al. |
| 2011/0023104 A1 | 1/2011 | Franklin |
| 2011/0026397 A1 | 2/2011 | Saltsidis et al. |
| 2011/0029652 A1 | 2/2011 | Chhuor et al. |
| 2011/0058573 A1 | 3/2011 | Balakavi et al. |
| 2011/0075369 A1 | 3/2011 | Sun et al. |
| 2011/0090633 A1 | 4/2011 | Rabinovitz |
| 2011/0103391 A1 | 5/2011 | Davis et al. |
| 2011/0113115 A1 | 5/2011 | Chang et al. |
| 2011/0119344 A1 | 5/2011 | Eustis |
| 2011/0123014 A1 | 5/2011 | Smith |
| 2011/0138046 A1 | 6/2011 | Bonnier et al. |
| 2011/0185370 A1 | 7/2011 | Tamir et al. |
| 2011/0191514 A1 | 8/2011 | Wu et al. |
| 2011/0191610 A1 | 8/2011 | Agarwal et al. |
| 2011/0197012 A1 | 8/2011 | Liao et al. |
| 2011/0210975 A1 | 9/2011 | Wong et al. |
| 2011/0239014 A1 | 9/2011 | Karnowski |
| 2011/0271159 A1 | 11/2011 | Ahn et al. |
| 2011/0273840 A1 | 11/2011 | Chen |
| 2011/0295991 A1 | 12/2011 | Aida |
| 2011/0296141 A1 | 12/2011 | Daffron |
| 2011/0320690 A1 | 12/2011 | Petersen et al. |
| 2012/0011500 A1 | 1/2012 | Faraboschi et al. |
| 2012/0020207 A1 | 1/2012 | Corti et al. |
| 2012/0050981 A1 | 3/2012 | Xu et al. |
| 2012/0054469 A1 | 3/2012 | Ikeya et al. |
| 2012/0054511 A1 | 3/2012 | Brinks et al. |
| 2012/0081850 A1 | 4/2012 | Regimbal et al. |
| 2012/0096211 A1 | 4/2012 | Davis et al. |
| 2012/0099265 A1 | 4/2012 | Reber |
| 2012/0131201 A1 | 5/2012 | Matthews et al. |
| 2012/0155168 A1 | 6/2012 | Kim et al. |
| 2012/0198252 A1 | 8/2012 | Kirschtein et al. |
| 2012/0207165 A1 | 8/2012 | Davis |
| 2012/0297042 A1 | 11/2012 | Davis et al. |
| 2013/0010639 A1 | 1/2013 | Armstrong et al. |
| 2013/0024645 A1 | 1/2013 | Cheriton et al. |
| 2013/0031331 A1 | 1/2013 | Cheriton et al. |
| 2013/0058250 A1 | 3/2013 | Casado et al. |
| 2013/0094499 A1 | 4/2013 | Davis et al. |
| 2013/0097448 A1 | 4/2013 | Davis et al. |
| 2013/0111107 A1 | 5/2013 | Chang et al. |
| 2013/0148667 A1 | 6/2013 | Hama et al. |
| 2013/0163605 A1 | 6/2013 | Chandra et al. |
| 2013/0290643 A1 | 10/2013 | Lim et al. |
| 2013/0290650 A1 | 10/2013 | Chang et al. |
| 2013/0318269 A1 | 11/2013 | Dalal et al. |
| 2014/0122833 A1 | 5/2014 | Davis et al. |
| 2014/0359044 A1 | 12/2014 | Davis et al. |
| 2014/0365596 A1 | 12/2014 | Kanevsky et al. |
| 2015/0039840 A1 | 2/2015 | Chandra et al. |
| 2015/0103826 A1 | 4/2015 | Davis |

FOREIGN PATENT DOCUMENTS

| | | |
|---|---|---|
| WO | WO-2004/021641 | 3/2004 |
| WO | WO-2005/013143 | 2/2005 |
| WO | WO-2008/000193 | 1/2008 |
| WO | WO-2011/044271 | 4/2011 |
| WO | WO-2012/037494 | 3/2012 |

OTHER PUBLICATIONS

Notice of Allowance on U.S. Appl. No. 13/475,713, mailed Feb. 5, 2015.

Notice of Allowance on U.S. Appl. No. 13/527,498, mailed Feb. 23, 2015.

Search Report on EP Application 10827330.1, mailed Feb. 12, 2015.

Notice of Allowance on U.S. Appl. No. 13/475,722, mailed Feb. 27, 2015.

Non-Final Office Action on U.S. Appl. No. 13/234,054, mailed Aug. 6, 2015.

Advanced Switching Technology Tech Brief, published 2005, 2 pages.

Chapter 1 Overview of the Origin Family Architecture from Origin and Onyx2 Theory of Operations Manual, published 1997, 18 pages.

Cisco MDS 9000 Family Multiprotocol Services Module, published 2006, 13 pages.

Comparing the I2C BUS to the SMBUS, Maxim Integrated, Dec. 1, 2000, p. 1.

Deering, "IP Multicast Extensions for 4.3BSD UNIX and related Systems," Jun. 1999, 5 pages.

Extended European Search Report for EP 10827330.1, mailed Jun. 5, 2013.

Final Office Action on U.S. Appl. No. 12/889,721, mailed Apr. 17, 2014.

Final Office Action on U.S. Appl. No. 12/794,996, mailed Jun. 19, 2013.

Final Office Action on U.S. Appl. No. 13/624,725, mailed Nov. 13, 2013.

Final Office Action on U.S. Appl. No. 13/624,731, mailed Jul. 25, 2014.

Final Office Action on U.S. Appl. No. 13/705,340, mailed Aug. 2, 2013.

Final Office Action on U.S. Appl. No. 13/705,414, mailed Aug. 9, 2013.

Final Office Action on U.S. Appl. No. 13/624,731, mailed Nov. 12, 2013.

fpga4fun.com,"What is JTAG?", 2 pages, Jan. 31, 2010.

From AT to BTX: Motherboard Form Factor, Webopedia, Apr. 29, 2005, p. 1.

HP Virtual Connect Traffic Flow—Technology brief, Jan. 2012, 22 pages.

International Preliminary Report on Patentability for PCT/US2009/044200, mailed Nov. 17, 2010.

International Preliminary Report on Patentability for PCT/US2012/038986 issued on Nov. 26, 2013.

International Preliminary Report on Patentability for PCT/US2012/061747, mailed Apr. 29, 2014.

International Preliminary Report on Patentability issued on PCT/US12/62608, issued May 6, 2014.

International Search Report and Written Opinion for PCT/US12/38987, mailed Aug. 16, 2012.

International Search Report and Written Opinion for PCT/US12/61747, mailed Mar. 1, 2013.

International Search Report and Written Opinion for PCT/US12/62608, mailed Jan. 18, 2013.

International Search Report and Written Opinion for PCT/US2010/053227, mailed May 10, 2012.

International Search Report and Written Opinion for PCT/US2011/051996, mailed Jan. 19, 2012.

International Search Report and Written Opinion on PCT/US09/44200, mailed Jul. 1, 2009.

International Search Report and Written Opinion on PCT/US2012/038986, mailed Mar. 14, 2013.

Jansen et al., "SATA-IO to Develop Specification for Mini Interface Connector" Press Release Sep. 21, 2009, Serial ATA3 pages.

Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.

Non-Final Action on U.S. Appl. No. 13/728,362, mailed Feb. 21, 2014.

Non-Final Office Action on U.S. Appl. No. 12/889,721, mailed Jul. 2, 2013.

Non-Final Office Action on U.S. Appl. No. 13/475,722, mailed Jan. 17, 2014.

Non-Final Office Action on U.S. Appl. No. 12/794,996, mailed Sep. 17, 2012.

Non-Final Office Action on U.S. Appl. No. 12/889,721, mailed Oct. 11, 2012.

Non-Final Office Action on U.S. Appl. No. 12/889,721, mailed Sep. 29, 2014.

(56) References Cited

OTHER PUBLICATIONS

Non-Final Office Action on U.S. Appl. No. 13/284,855, mailed Dec. 19, 2013.
Non-Final Office Action on U.S. Appl. No. 13/453,086, mailed Mar. 12, 2013.
Non-Final Office Action on U.S. Appl. No. 13/475,713, mailed Apr. 1, 2014.
Non-Final Office Action on U.S. Appl. No. 13/527,505, mailed May 8, 2014.
Non-Final Office Action on U.S. Appl. No. 13/527,498, Mailed May 8, 2014.
Non-Final Office Action on U.S. Appl. No. 13/624,725, mailed Jan. 10, 2013.
Non-final office action on U.S. Appl. No. 13/624,731 mailed Jan. 29, 2013.
Non-Final Office Action on U.S. Appl. No. 13/692,741, mailed Sep. 4, 2014.
Non-Final Office Action on U.S. Appl. No. 13/705,286, mailed May 13, 2013.
Non-Final Office Action on U.S. Appl. No. 13/705,340, mailed Mar. 12, 2014.
Non-Final Office Action on U.S. Appl. No. 13/705,340, mailed Mar. 29, 2013.
Non-Final Office Action on U.S. Appl. No. 13/705,414, mailed Apr. 9, 2013.
Non-Final Office Action on U.S. Appl. No. 13/705,428, mailed Jul. 10, 2013.
Notice of Allowance on U.S. Appl. No. 13/453,086, mailed Jul. 18, 2013.
Notice of Allowance on U.S. Appl. No. 13/705,386, mailed Jan. 24, 2014.
Notice of Allowance on U.S. Appl. No. 13/705,414, mailed Nov. 4, 2013.
Notice of Allowance on U.S. Appl. No. 13/284,855, mailed Jul. 14, 2014.
Venaas, "IPv4 Multicast Address Space Registry," 2013, http://www.iana.org/assignments/multicast-addresses/multicast-addresses.xhtml.
Final Office Action on U.S. Appl. No. 12/889,721, mailed May 22, 2015.
Non-Final Office Action on U.S. Appl. No. 13/728,428, mailed Jun. 12, 2015.
Non-Final Office Action on U.S. Appl. No. 13/728,308, mailed May 14, 2015.
Non-Final Office Action on U.S. Appl. No. 14/052,723, mailed May 1, 2015.
Final Office Action on U.S. Appl. No. 14/334,931, mailed Jul. 9, 2015.
Non-Final Office Action on U.S. Appl. No. 13/692,741, mailed Jul. 1, 2015.
Final Office Action on U.S. Appl. No. 14/106,698, mailed Aug. 19, 2015.
Non-Final Office Action on U.S. Appl. No. 14/106,697, mailed Aug. 17, 2015.
Notice of Allowance U.S. Appl. No. 13/728,308, mailed Oct. 7, 2015.
Final Office Action on U.S. Appl. No. 13/624,725, mailed Nov. 2, 2015.
Final Office Action on U.S. Appl. No. 13/234,054, mailed Apr. 16, 2015.
Non-Final Office Action on U.S. Appl. No. 13/624,725, mailed Apr. 23, 2015.
Elghany et al., "High Throughput High Performance NoC Switch," NORCHIP 2008, Nov. 2008, pp. 237-240.
Grecu et al., "A Scalable Communication-Centric SoC Interconnect Architecture" Proceedings 5th International Symposium on Quality Electronic Design, 2005, pp. 343, 348 (full article included).
Hossain et al., "Extended Butterfly Fat Tree Interconnection (EFTI) Architecture for Network on Chip," 2005 IEEE Pacific Rim Conference on Communications, Computers and Signal Processing, Aug. 2005, pp. 613-616.
Non-Final Office Action on U.S. Appl. No. 14/334,931, mailed Jan. 5, 2015.
Pande et al., "Design of a Switch for Network on Chip Applications," May 25-28, 2003 Proceedings of the 2003 International Symposium on Circuits and Systems, vol. 5, pp. V217-V220.
Final Office Action on U.S. Appl. No. 13/475,713, mailed Oct. 17, 2014.
Final Office Action on U.S. Appl. No. 13/475,722, mailed Oct. 20, 2014.
Non-Final Office Action on U.S. Appl. No. 13/234,054, mailed Oct. 23, 2014.
Non-Final Office Action on U.S. Appl. No. 13/662,759, mailed Nov. 6, 2014.
Final Office Action on U.S. Appl. No. 13/527,498, mailed Nov. 17, 2014.
Final Office Action on U.S. Appl. No. 13/527,505, mailed Dec. 5, 2014.
Notice of Allowance on U.S. Appl. No. 13/705,340, mailed Dec. 3, 2014.
Final Office Action on U.S. Appl. No. 13/692,741, mailed Mar. 11, 2015.
Notice of Allowance on U.S. Appl. No. 13/527,505, mailed Mar. 6, 2015.
Notice of Allowance on U.S. Appl. No. 13/624,731, mailed Mar. 5, 2015.
Final Office Action on U.S. Appl. No. 14/052,723, mailed Dec. 3, 2015.
Non-Final Office Action on U.S. Appl. No. 14/334,931 Mailed Dec. 11, 2015.
Notice of Allowance on U.S. Appl. No. 13/692,741 mailed Dec. 4, 2015.
Final Office Action on U.S. Appl. No. 13/234,054, mailed Jan. 26, 2016.
Final Office Action on U.S. Appl. No. 13/662,759, mailed Feb. 22, 2016.
Das et al., "Unifying Packet and Circuit Switched Networks," IEEE Globecom Workshops 2009, Nov. 30 2009, pp. 1-6.
Final Office Action on U.S. Appl. No. 13/624,725 mailed Mar. 10, 2016.
Final Office Action on U.S. Appl. No. 14/106,697 mailed Feb. 2, 2016.
Non-Final Office Action on U.S. Appl. No. 12/889,721, mailed Feb. 24, 2016.
Non-Final Office Action on U.S. Appl. No. 14/725,543 mailed Apr. 7, 2016.
Notice of Allowance on U.S. Appl. No. 13/624,725, mailed Mar. 30, 2016.
Final Office Action on U.S. Appl. No. 13/728,428 mailed May 6, 2016.
Notice of Allowance on U.S. Appl. No. 13/662,759 mailed May 10, 2016.
Notice of Allowance on U.S. Appl. No. 14/334,931 mailed May 20, 2016.
Notice of Allowance on U.S. Appl. No. 13/728,428 mailed Jul. 18, 2016.
Notice of Allowance on U.S. Appl. No. 14/725,543 mailed Jul. 21, 2016.
Final Office Action on U.S. Appl. No. 12/889,721 mailed Aug. 2, 2016.

* cited by examiner

SYSTEM AND METHOD FOR DATA CENTER SECURITY ENHANCEMENTS LEVERAGING MANAGED SERVER SOCS

CROSS-REFERENCE TO RELATED PATENT APPLICATIONS

This application is a Continuation of U.S. application Ser. No. 13/475,722, filed May 18, 2012, which claims priority from Provisional U.S. Application 61/489,569, filed May 24, 2011; U.S. application Ser. No. 13/475,722 is also a Continuation-In-Part of U.S. application Ser. No. 12/794,996, filed Jun. 7, 2010, which claims priority from Provisional U.S. Application 61/256,723, filed Oct. 30, 2009, all of which are incorporated herein by reference in their entirety.

FIELD

The disclosure relates generally to security aspects for data centers and in particular to data center security enhancements leveraging server systems on a chip (SOCs) or server switch fabrics.

BACKGROUND

FIGS. 1A and 1B show a classic data center network aggregation as is currently well known. FIG. 1A shows a diagrammatical view of a typical network data center architecture 100 wherein top level switches 101a-n are at the tops of racks 102a-n filled with blade servers 107a-n interspersed with local routers 103a-f. Additional storage routers and core switches. 105a-b and additional rack units 108a-n contain additional servers 104 e-k and routers 106a-g FIG. 1b shows an exemplary physical view 110 of a system with peripheral servers 111a-bn arranged around edge router systems 112a-h, which are placed around centrally located core switching systems 113. Typically such an aggregation 110 has 1-Gb Ethernet from the rack servers to their top of rack switches, and often 10 Gb Ethernet ports to the edge and core routers. These typical data centers do not have good security.

The idea of network security is well known. The terms used in field of network security may include deep packet inspection (DPI) and intrusion prevention systems (IPS) which are also known as Intrusion Detection and Prevention Systems (IDPS) and are network security appliances that monitor network and/or system activities for malicious activity. The main functions of intrusion prevention systems are to identify malicious activity, log information about said activity, attempt to block/stop activity, and report activity. The network security may also utilize an intrusion detection system (IDS), which is a device or software application that monitors network and/or system activities for malicious activities or policy violations and produces reports to a Management Station.

FIG. 2 shows a typical implementation of an IDS and IPS within a corporate network. In the typical implementation, the IDS is focused on detection, monitoring, and reporting of potential intrusions. As such, the IDS is implemented out-of-line of the core network flow and is not invasive (located outside of the firewall and attached to a DMZ switch as shown in FIG. 2). The IPS adds the capability to prevent and block potential intrusion or undesired network flows and the IPS is implemented in-line of the core network flow.

Typical systems of a chip (SoCs) have security features, such as security zones. For example, ARM® processors and IP implement TrustZone as one layer of hardware, software, and system security. Further details of the TrustZone aspect of ARM® processors and IP can be found at http://www.arm.com/products/processors/technologies/trustzone.php and the materials located there are incorporated herein by reference. The security of the system is achieved by partitioning all of the SoC's hardware and software resources so that they exist in one of two worlds the Secure world for the security subsystem, and the Normal world for everything else. Hardware logic present in the TrustZone-enabled AMBA3 AXI bus fabric ensures that no Secure world resources can be accessed by the Normal world components, enabling a strong security perimeter to be built between the two.

The second aspect of the TrustZone hardware architecture is the extensions that have been implemented in some of the ARM® processor cores. These extensions enable a single physical processor core to safely and efficiently execute code from both the Normal world and the Secure world in a time-sliced fashion. This removes the need for a dedicated security processor core, which saves silicon area and power, and allows high performance security software to run alongside the Normal world operating environment. However, these SOC security features have not been effectively extended to the security of a data center.

Thus, it is desirable to provide a data center security system and method that leverage server systems on a chip (SOCs) and/or server fabrics, and it is to this end that the disclosure is directed.

DETAILED DESCRIPTION OF THE PREFERRED EMBODIMENTS

The disclosure is particularly applicable to a Calxeda™ server system on a chip and Calxeda™ switch fabrics as illustrated and described below with the security aspects and it is in this context that the disclosure will be described. However, the principles described below can be applied to other server-on-a-chip systems.

A server-on-a-chip (SOC) with packet switch functionality is focused on network aggregation. It contains a layer 2 packet switch, with routing based on source/destination MAC addresses. It further supports virtual local area network (VLAN), with configurable VLAN filtering on domain incoming packets to minimize unnecessary traffic in a domain. The embedded MACs within the SOC do have complete VLAN support providing VLAN capability to the overall SOC without the embedded switch explicitly having VLAN support.

Figure 1A:
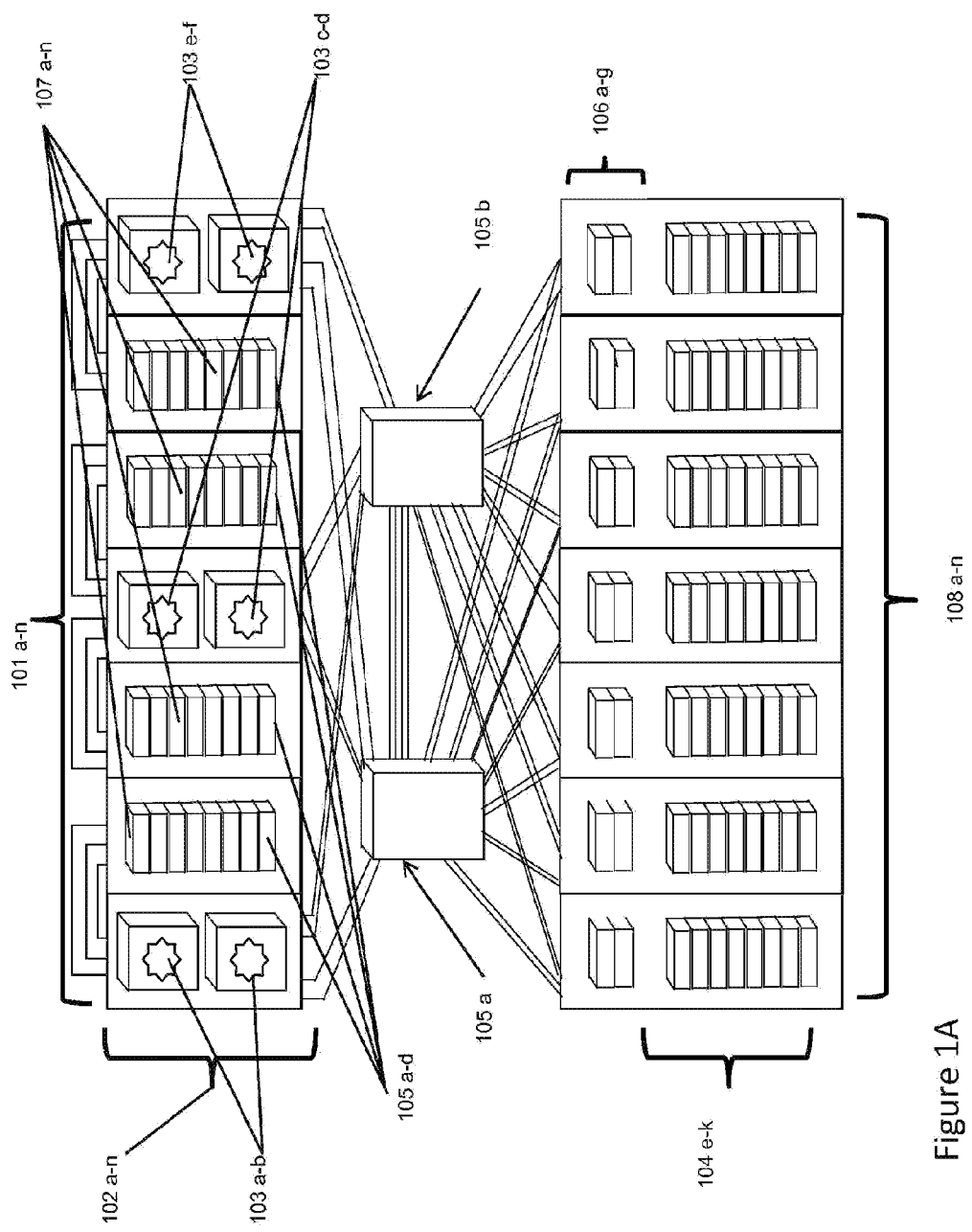
FIGS. 1A and 1B illustrate a typical data center system.
Figure 1B:
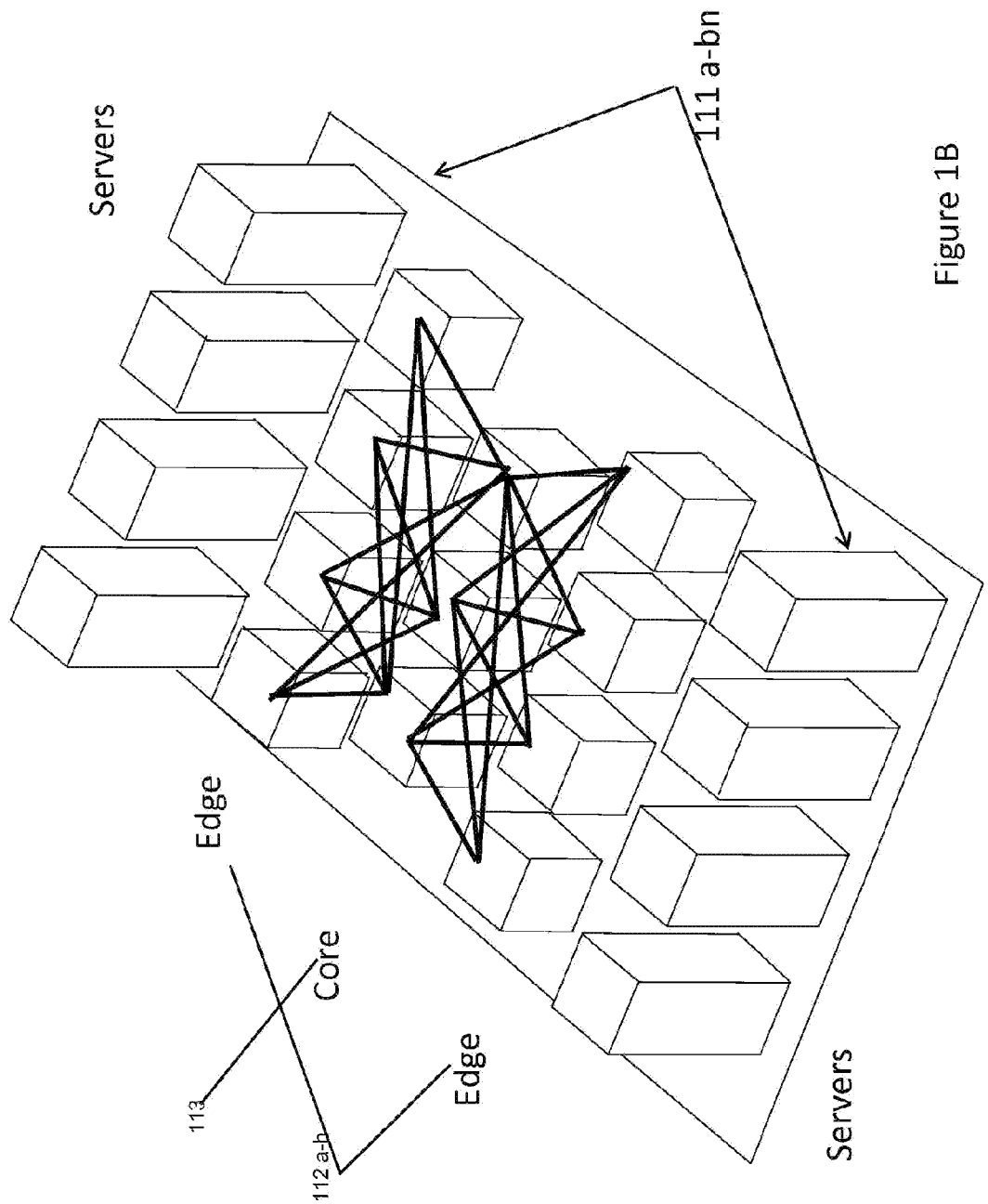
Figure 2:
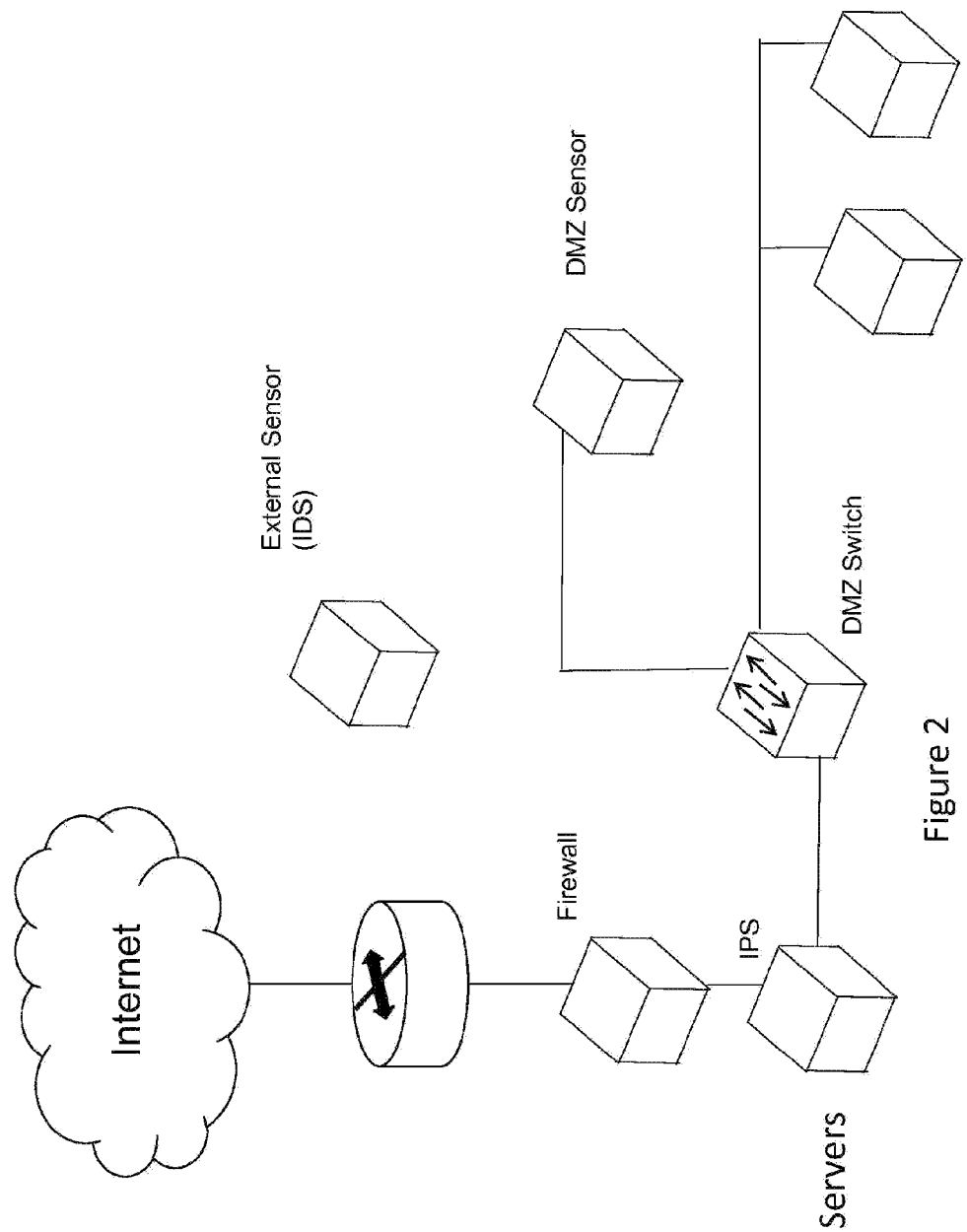
FIG. 2 shows a typical implementation of an IDS and IPS within a corporate network.
Figure 3:
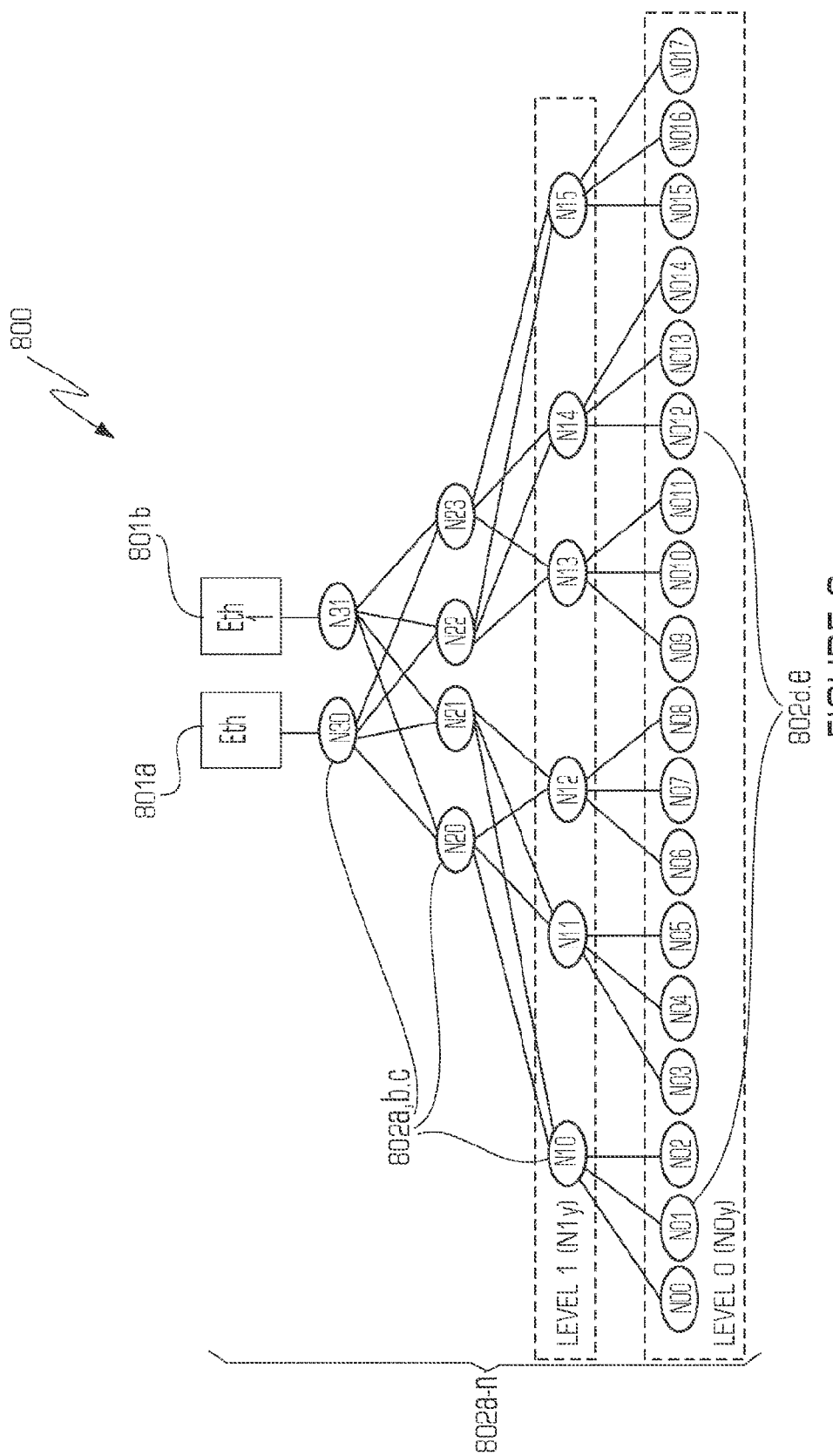
FIG. 3 illustrates a high-level topology of a network aggregating system that may be leveraged for increased security in a data center.

FIG. 3 shows a high-level topology 800 of the network system that illustrates XAUI (a well-known interface standard) connected SoC nodes connected by the switching fabric. Two 10 Gb Ethernet ports Eth0 801a and Eth1 801b come from the top of the tree. Ovals 802a-n are Calxeda™ nodes that comprise at least one computational processors and an embedded switch. Each node may have five XAUI links connected to the internal switch. The switching layers use all five XAUI links for switching. Level 0 leaf nodes 802d, e (i.e., N0n nodes, or Nxy, where x=level and y=item number) only use one XAUI link to attach to the interconnect, leaving four high-speed ports that can be used as XAUI, 10 Gb Ethernet, PCIe, SATA, etc., for attachment to I/O. The vast majority of trees and fat trees have active nodes only as leaf nodes, and the other nodes are pure switching nodes. This approach makes routing much more straightforward. Topology 800 has the flexibility to permit every node to be a combination computational and switch node, or just a switch node. Most tree-type implementations have I/O on the leaf nodes, but topology 800 let the I/O be on any node. In general, placing the Ethernet at the top of the tree (the Ethernet ports) minimizes the average number of hops to the Ethernet.

The system and method also supports a routing using a tree-like or graph topology that supports multiple links per node, where each link is designated as an Up, Down, or Lateral link, or both, within the topology. In addition, each node in the system may be a combination computational/switch node, or just a switch node, and input/output (I/O) can reside on any node as described below in more detail. The system may also provide a system with a segmented Ethernet Media Access Control (MAC) architecture which may have a method of re-purposing MAC IP addresses for inside MACs and outside MACs, and leveraging what would normally be the physical signaling for the MAC to feed into the switch. The system may also provide a method of non-spoofing communication, as well as a method of fault-resilient broadcasting, which may have a method of unicast misrouting for fault resilience.

A data center with the Calxeda™ server system on a chip may be implemented using the set of fabric connected nodes with Ethernet uplinks as shown in FIG. 3. Each node may be one or more Calxeda server boxes each of which has at least one Calxeda™ server system on a chip.

Figure 4:
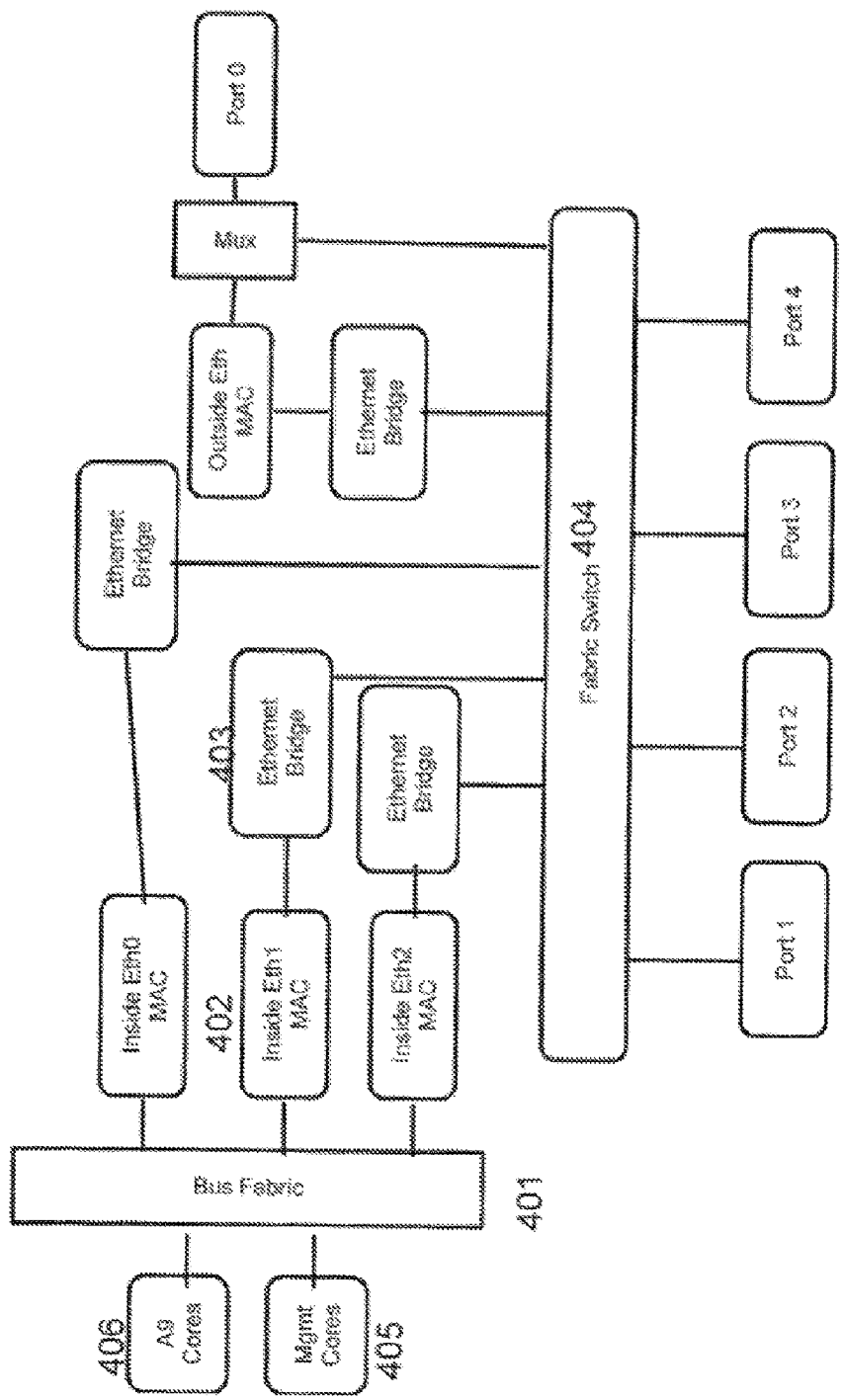
FIG. 4 illustrates a block diagram of an exemplary switch of the network aggregation system that may be leveraged for increased security in a data center.
Figure 5:
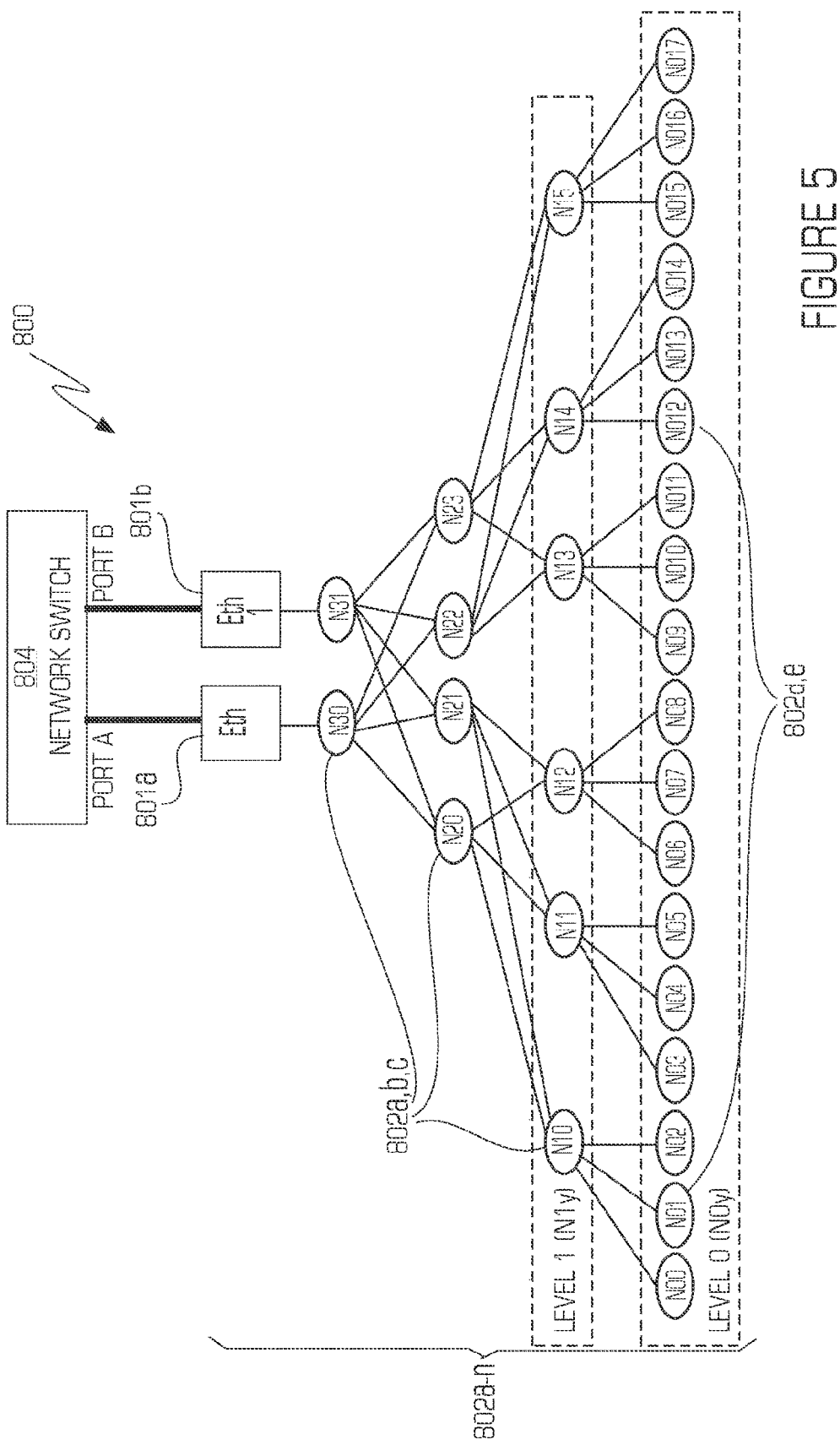
FIG. 5 illustrates a network aggregation system with a network switch and enhanced security.
Figure 6:
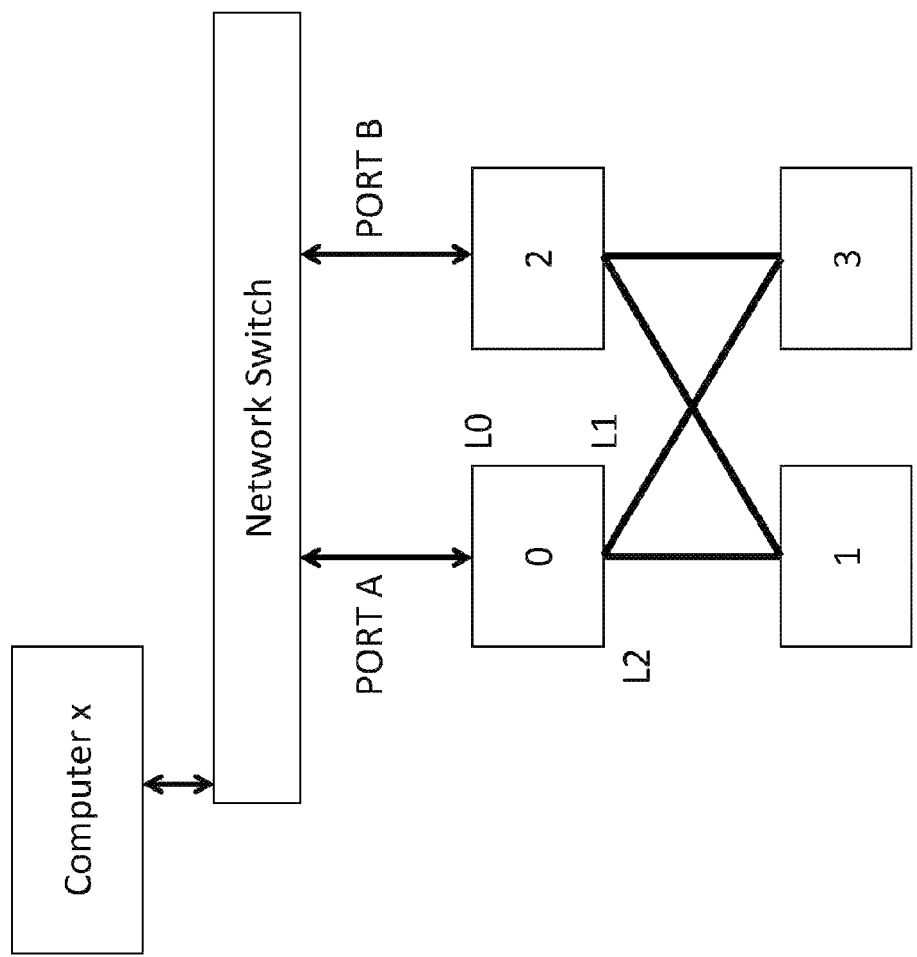
FIG. 6 illustrates a four-node server fabric with a network switch and enhanced security.
Figure 7:
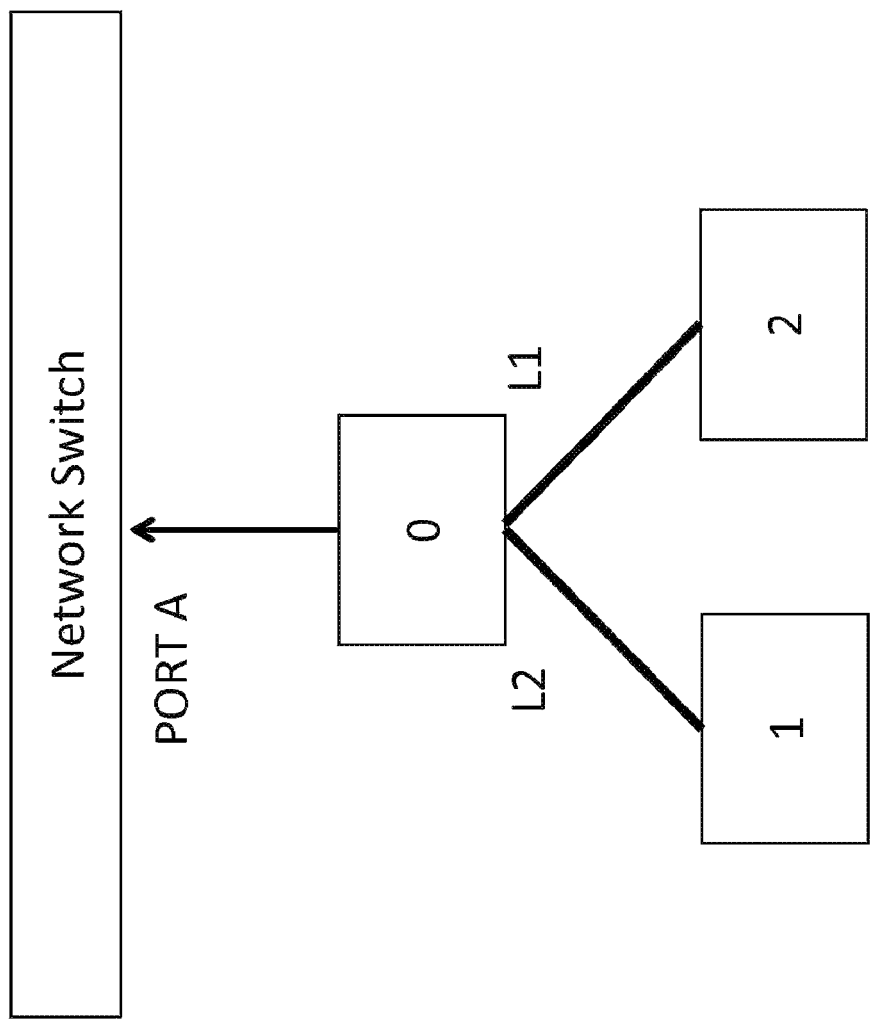
FIG. 7 illustrates a small three-node server fabric with a network switch and enhanced security.

The system may also provide a rigorous security between the management processor cores, such that management processors can "trust" one another. In the example node 900 shown in FIG. 4 (which is described below in more detail), there is a management processor core within each SoC (block 906, FIG. 4). The software running on the management processor is trusted because a) the vendor (in this case Calxeda™) has developed and verified the code, b) non-vendor code is not allowed to run on the processor. Maintaining a Trust relationship between the management processors allow them to communicate commands (e.g. reboot another node) or request sensitive information from another node without worrying that a user could spoof the request and gain access to information or control of the system.

Typically the management processor, block 906, is running an embedded OS, while the multiple processor cores represented by block 905 are more typically running a standard operating system, such as Linux. The management processor would typically use one of the Ethernet MACs, in this case block 907, while the main processors, block 905, would utilize the remaining Ethernet MACs, in this case blocks 902 and 903.

Each routing header unit 901, that may be implemented as a processing unit or processor, prepends routing headers to layer 2 Ethernet frames to form a routing frame going into the fabric switch, and removes the routing headers as they leave the switch and enter standard Ethernet MACs. The routing frame is composed of the routing frame header plus the core part of the Ethernet frame, and is structured as shown in Table 1, below:

TABLE 1

Routing Header Prepended to Layer 2 Frame

| Routing Frame Header | Ethernet Frame Packet | | | | |
|---|---|---|---|---|---|
| RF Header | MAC destination | MAC Source | Ethertype/ Length | Payload (data and padding) | CRC32 |

The routing frame header (RF Header) typically consists of the fields shown in Table 2, below:

TABLE 2

Routing Header Fields

| Field | Width (Bits) | Notes |
|---|---|---|
| Domain ID | 5 | Domain ID associated with this packet. 0 indicates that no domain has been specified. |
| Mgmt Domain | 1 | Specifies that the packet is allowed on the private management domain. |
| Source Node | 12 | Source node ID |
| Source Port | 2 | 0 = MAC0, 1 = MAC1, 2 = MAC_management processor, 3 = MAC_OUT |
| Dest Node | 12 | Destination node ID |
| Dest Port | 2 | 0 = MAC0, 1 = MAC1, 2 = MAC_management processor, 3 = MAC_OUT |
| RF Type | 2 | Routing Frame Type (0 = Unicast, 1 = Multicast, 2 = Neighbor Multicast, 3 = Link Directed) |
| TTL | 6 | Time to Live-# of hops that this frame has existed. Switch will drop packet if the TTL threshold is exceeded (and notify management processor of exception). |
| Broadcast ID | 5 | Broadcast ID for this source node for this broadcast packet. |
| Checksum | | Checksum of the frame header fields. |
| Total | 46 | +checksum |

The Routing Header processor 901 contains a MAC Lookup CAM (Content Addressable Memory) (MCAM), macAddrLookup, that maps from 6 byte MAC addresses to 12-bit Node IDs, as shown in Table 3, below.

TABLE 3

MAC Address CAM (MCAM)

| MAC Lookup CAM Input | | MAC Lookup CAM Output | |
|---|---|---|---|
| Node Local | MAC Address | Node ID | Port ID |
| 1 bit | 6 bytes | 12 bits | 2 bits |

The approach to security domain management in the system and method disclosed here is as follows: Support multiple domain IDs within the fabric. Allow each of the MACs within a node (management processor, MAC0, MAC1, Gateway) to be assigned to a domain ID individually (and tagged with domain 0 if not set). Allow each of the MACs within a node to have a bit indicating access to the management domain. The domain IDs associated with a MAC could only be assigned by the management processor, and could not be altered by the A9. For frames generated by MACs (both inside and outside), the routing frame processor would tag the routing frame with the domain ID and management domain state associated with that MAC. Domains would provide the effect of tunnels or VLANs, in that they keep packets (both unicast and multicast) within that domain, allowing MACs outside that domain to be able to neither sniff or spoof those packets. Additionally, this approach would employ a five-bit domain ID. It would add options to control domain processing, such as, for example, a switch with a boolean per MAC that defines whether packets are delivered with non-defined (i.e., zero) domain ID, or a switch that has a boolean per MAC that defines whether packets are delivered with defined (non-zero) but non-matching domain IDs. A further option in the switch could turn off node encoded MAC addresses per MAC (eliminating another style of potential attack vector). Each of these options described in this paragraph are options that are implemented in the fabric switch, controlled by bits in the control status registers (CSRs) of the fabric switch. Software initializes the CSRs to the desired set of options.

To keep management processor to management processor communication secure, the management domain bit on all management processor MACs could be marked. Generally, the management processor should route on domain 1 (by convention). Such a technique allows all the management processor's to tunnel packets on the management domain so that they cannot be inspected or spoofed by any other devices (inside or outside the fabric), on other VLANs or domains. Further, to provide a secure management LAN, a gateway MAC that has the management domain bit set could be assigned, keeping management packets private to the management processor domain. Additionally, the switch fabric could support "multi-tenant" within itself, by associating each gateway MAC with a separate domain. For example, each gateway MAC could connect to an individual port on an outside router, allowing that port to be optionally associated with a VLAN. As the packets come into the gateway, they are tagged with the domain ID, keeping that traffic private to the MACs associated with that domain across the fabric.

Unicast routing is responsible for routing non-multicast (i.e. unicast) packets to the next node. This is done by utilizing a software computed unicastRoute[ ] next node routing table that provides a vector of available links to get to the destination node.

Server Interconnect Fabric Security

The above server fabric and switch fabric can benefit by enhanced security and a number of techniques to leverage and extend upon server interconnect fabrics that have some or all of the characteristics described above to dramatically improve security within a data center are described. The different embodiments implement "packet processing" which may include a wide range of packet processing including, but not limited to: IDS functionality, IPS functionality, sFlow monitoring (wherein sFlow is a specification for monitoring computer networks set forth in an sFlow specification that is RFC 3176) Packet routing or bridging between networks, Deep packet inspection, Packet logging, Transparent VPN encapsulation, Packet encryption/decryption and/or Packet compression/decompression.

Use of Management Processor for Out-of-Band Security

A first embodiment relates to the use of management processor for out-of-band security. The integration of a separate management processor within the same SoC as the core application processors enables new classes of security. The enabling attributes of the management processor include:

Management processor running within Secure world security zone. Application processor running in Normal world security zone, although underlying secure hypervisors on the Application processor may have the ability to run in Secure world.

The management processor by running in Secure world has complete access to all the resources of the SoC including:

processor state of the application processor
debug control of the application processor
access to all memory and peripheral resources of the Soc This technique allows the management processor running in Secure world to provide Out-of-Band (OOB), as seen by the application processors, communication between nodes to facilitate security/integrity monitoring services. These innovations include:

Since the management processor can access all SoC RAM, management processors on different nodes can compare portions of the DRAM on their nodes to identify unexpected changes to memory regions that are expected to not vary over time.

This facilitates not only security use cases, but also a dynamic fault discovery use case.

Live capture of a node's memory image, or parts of it, or signatures of it, for any purpose—troubleshooting, forensics, image migration, hibernation, by other management or application processors, or even by external systems. This OOB peek mechanism could be used to facilitate malware detection from a central location utilizing a management controller that just answers requests to fetch portions of memory, offloading the analysis to a computer with more resources.

This allows the malware detection engine to be free from modification attempts by malware—there isn't anything the malware can do to disable the "anti-virus" detection since the mechanisms are completely OOB and protected from the application processors.

Can be used in combination with code running on the application processor—application whitelisting, for example. The application processor can request the management processor to verify the authenticity of some code before running it. This should be more secure than whitelisting code running in the kernel on the application processor, which is the current technique being used.

Isolation of Nodes that have been Security Compromised or are Malfunctioning

The second embodiment relates to the isolation of nodes that have been security compromised or are malfunctioning. There are cases where, though other known techniques not described herein, a determination has been made that a node needs to be isolated, including:

A security violation has been detected on a node, including a compromised OS kernel, a root kit, or a damaging virus.

There are also failure modes, both hardware and software, that could cause a node to fail in such a way that it is causing disruptive traffic on the server fabric.

Compromise detection is software driven, can come from any source including failures in remote attestation, malware detection, IPS/IDS built into the fabric, or external, manual operator control, management processor DRAM monitoring as discussed in Disclosure 9, and by other known means.

The following techniques can be used to isolate offending nodes:

The management processor can power off the application processor, or the offending peripheral.

The management processor can alter the security zone settings to software isolate the offending device or processor.

The management processor can alter the fabric MCAM, routing tables, or gateway node IDs to prevent the fabric from emitting potentially compromised packets into the fabric.

Use the Management Processor to Provide Controller/Device Virtualization for the Application Processors The third embodiment relates to the use of the management processor to provide controller/device virtualization for the application processors. The management processor can be used to provide controller or device virtualization for the application processor for both local and remote devices using the following technique:

Use TrustZone or similar security zones to block access to a device from the application processors, and then have the application processor communicate to the management processor to access it. For example, the application processor could send a NAND read request to the management processor via IPC (Inter-Processor Communication channel), the management processor could approve or disapprove it, and then forward the request to the NAND controller protected in Secure world. The management processor can then return the status of the request to the application processor via IPC. This mechanism can be similarly used for other forms of access control and logging.

A network firewall, IPS, or IDS can also be implemented via this technique. The management processor can inspect packets before forwarding them to a MAC that is protected via Secure World.

Trusted Platform Module (TPM) services can similarly be provided by the management processor.

The management processor can take advantage of the server fabric when deciding what to do with requests to access devices—request remote authorization for example.

The management processor could log requests either locally or remotely.

Using the Management Processor to Provide a Secure Logging Path

The fourth embodiment relates to using the management processor to provide a secure logging path since keeping logs secure for audits is a significant aspect of most regulatory/financial compliance requirements. This can be accomplished using the following technique:

In traditional systems, the application processor would rely on logging to local storage, network storage, or communicating logging data to a remote server. With this technique, the application processor can send log messages securely to the management processor.

The logging mechanism of the management processor is thus completely decoupled and secured from the application processor.

The management processor then has multiple options for persisting the secured logging, including:

Logging to a central log server via it's secure management fabric domain

Log locally to private storage to the management processor

Log to other storage subsystems protected in the Secure trust world, not accessible to the application processor.

Use the Management Processor to Provide a Secure Auditing Path

The fifth embodiment relates to the use of the management processor to provide a secure auditing path. Instead of relying on the main network domain to the application processor to perform audits of systems, this technique will utilize the management domain to secure the audit processes.

Allows network audits to be done securely, in secure network paths.

As an example, part of an audit may be to perform a port scan of a system. This is relatively low bandwidth—instead of talking directly to the application processor over its normal data path, the request can be proxied via the management processor in a network-proxy type fashion.

In one implementation, the management processor can do this is a 'dumb' method, using techniques such as SNAT (secure network address translation) to ensure the responses are routed back through the management processor instead of out over the fabric.

Or the management processor can have local auditing control. An example of this implementation may include responding to a port scan request and generate the port scan traffic itself. An additional example is logging in via ssh to verify logs, file integrity, permission integrity, or similar auditing tasks.

Use the Management Processor to Provide Out-of-Band (OOB) Network Access to the Application Processor The sixth embodiment relates to the use of the management processor to provide out-of-band (OOB) network access to the application processor. This technique extends the technique described above by using the management processor as a NATing router using the following technique:

An application processor may use a Ethernet controller (say MAC0) to communicate in its main 'data path'—traffic sent out it is routed out via the fabric like normal, at line rate, not touched by the management processor.

An application processor can further use a second Ethernet controller (say MAC1) to communicate with external hosts via the management processor.

An extra MAC address can be associated with a node's management processor's MAC port so that any traffic sent to either of two MAC addresses goes to that port.

One of the MAC addresses can be used for normal IP traffic for the management processor.

The other can be recognized by special software on the management processor as being destined for the application processor.

The management processor can then do a NAT type change of the destination MAC address of the packet so that the fabric switch will route it to MAC1, where the application processor will receive it. It can also change the source MAC address to the original destination MAC address of the packet, so that a response to the source MAC address will also be directed to the management processor's MAC.

The application processor side won't need any special software to support this.

Could potentially do this on not just the local application processor, but also over the fabric to other nodes. Could use a second application processor instead of the local management processor in that implementation.

Dynamic Security Zones for DMA Masters

The seventh embodiment relates to dynamic security zones for direct memory access (DMA) masters. With the ARM TrustZone implementation, as well as other security zone implementations, the DMA Masters, including independent DMA controllers as well as those found embedded in peripheral IP such as disk and ethernet controllers, are configured to either respond to the Secure world or the Normal world. IP vendors either hardwire this setting and don't allow you to change it, or offer a parameter to set it one-way permanently. The following technique extends the fixed relationship of DMA Master's to security zones:

A security zone register is added between the internal SoC fabric and each DMA master.

The security zone register is itself protected in Secure world so that untrusted master's can change it.

The security zone register provides the current security zone to the internal SoC fabric for that transaction.

This enables use cases including:

Static configuration of DMA master security zones at boot time. If a thread running in Normal world attempts to access a DMA master that is configured in Secure world than the thread will get an equivalent of a bus abort.

Ability for trusted hypervisors running in Secure world to dynamically change the visibility of DMA master's depending. This allows for some guest OS's to be able to directly access a DMA master while other's won't have visibility to it.

Secure Boot-Loading of the Application Processor by the Management Processor

The eighth embodiment relates to secure boot-loading of the application processor by the management processor. The management processor can bootstrap the application processor by preloading the application processor's boot-loader into DRAM prior to releasing the application processor from reset. This allows the management processor to completely control the contents of the application processors boot-loader, including whether or not the application processor exits secure world immediately and permanently, whether the application processor can selectively enter secure mode, and which interrupts it can service in secure mode only. It also allows the application processor's boot-loader to be cryptographically verified prior to loading it, to ensure the integrity of the boot-loader, or to insure the boot loader was signed by a proper authority. It also allows the application processor's boot loader to be stored in a location inaccessible to the application processor itself, which prevents the application processor from modifying it, while still allowing it to be updated via the management processor's secure channels. The management processor can use its secure management fabric domain to source the application processor's boot-loader dynamically on demand, or can retrieve new versions of it that can be stored in local non-volatile memory.

DMA Master Configurable Coherency

The ninth embodiment relates to DMA master configurable coherency. In traditional SoC implementations, a DMA master is designed to be either cache-coherent, or non-coherent. This design usually includes the following characteristics:

For a cache-coherent implementation, the DMA master is connected to a cache-coherency controller. As an example, in one ARM implementation, the DMA master would be connected via AXI to the Accelerator Coherency Port.

For a non-cache coherent implementation, the DMA master is connected via the SoC internal fabric directly to the memory subsystem, bypassing the caching subsystem.

Other common implementation details include design configuration of the DMA master on cacheability configuration.

Using the technique of this embodiment, a DMA master may be dynamically configured as either coherent or non-coherent using the following technique:

A software controlled multiplexer may be defined to map the DMA Master to either a coherent port on the cache coherency controller, or directly to the memory subsystem, bypassing the caching subsystem.

Software controlled register over-rides any hardwired cacheability settings found in the DMA Master IP, so cacheability can be altered when switching between the coherent and non-coherent configuration.

The cache-coherent and non-coherent interfaces to a DMA controller can affect both the ease of writing the device driver and the resulting performance. But, these tradeoffs can vary by operating system, implementation of the device driver, as well as the devices connected to the DMA master.

This technique allows a specific hardware/software/system implementation to be optimized at boot-time, rather than hard-wiring the DMA Master coherency decision at SoC design time.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A system on a chip (SoC) node comprising:
   a management processor configured to generate management information;
   an application processor coupled to the management processor; and
   a routing header unit configured to prepend a routing header to the management information to form a management information routing frame, wherein the routing header includes a management processor domain indicator which specifies that the management information routing frame is to remain within a management processor domain during routing;
   wherein the management processor is further configured to have access to a processor state of the application processor, access to a debug control of the application processor, and access to a memory and peripheral resources of the SoC node,
   wherein the management processor is further configured to run within a secure world security zone, and wherein the application processor in the plurality of nodes is configured to run within a normal world security zone.

2. The SoC node of claim 1, further comprising a media access control (MAC) that is associated with the management processor, wherein the MAC is configured to form a MAC packet for the management information, and wherein the routing header unit is further configured to prepend the routing header to the MAC packet.

3. The SoC node of claim 1, wherein the management processor is further configured to run an embedded operating system (OS), and wherein the application processor is configured to run a standard OS.

4. The SoC node of claim 3, wherein the standard OS is Linux.

5. The SoC node of claim 1, wherein the management processor domain indicator is one bit.

6. The SoC node of claim 1, wherein the management processor is in the management processor domain, and wherein the application processor is not in the management processor domain.

7. A system on a chip (SoC) node fabric comprising:
   a plurality of SoC nodes interconnected to each other to form a fabric, wherein each of the plurality of SoC nodes includes:

a management processor configured to generate management information;

an application processor coupled to the management processor; and a routing header unit configured to prepend a routing header to the management information to form a management information routing frame, wherein the routing header comprises a management processor domain indicator which specifies that the management information routing frame is to remain within a management processor domain during routing;

wherein the management processors are further configured to have access to a processor state of the application processors, access to a debug control of the application processors, and access to a memory and peripheral resources of the plurality of SoC nodes, wherein the management processors are further configured to run within a secure world security zone, and wherein the application processors in the plurality of nodes are configured to run within a normal world security zone.

8. The SoC node fabric of claim 7, wherein the management processor domain comprises the management processors but not the application processors.

9. The SoC node fabric of claim 7, wherein the management processors are further configured to run verified code thereon.

10. The SoC node fabric of claim 7, wherein the management processors are further configured to communicate commands or sensitive information with one another.

11. The SoC node fabric of claim 7, wherein the management processors are further configured to provide out-of-band security for the plurality of SoC nodes.

12. The SoC node fabric of claim 7, wherein the management processor domain comprises a gateway media access control (MAC).

13. A method comprising:

interconnecting a plurality of SoC nodes, wherein each of the plurality of SoC nodes comprises a management processor, an application processor, and a routing header unit;

generating, by the management processors in the plurality of SoC nodes, management information, wherein the management processors are configured to have access to a processor state of the application processors, access to a debug control of the application processors, and access to a memory and peripheral resources of the plurality of SoC nodes: and prepending, by the routing header units in the SoC node, a routing header to the management information to form a management information routing frame, wherein the routing header includes a management processor domain indicator which specifies that the management information routing frame is to remain within a management processor domain during routing, wherein the management processors are further configured to run within a secure world security zone, and wherein the application processors in the plurality of nodes are configured to run within a normal world security zone.

14. The method of claim 13, wherein the management processor domain comprises the management processors but not the application processors.

15. The method of claim 13, further comprising:

running the management processors within a secure world security zone; and running the application processors within a normal world security zone.

16. The method of claim 13, further comprising running, by the management processors in the plurality of SoC nodes, verified code.

17. The method of claim 13, further comprising communicating, by the management processors in the plurality of SoC nodes, commands or sensitive information with one another.

18. The method of claim 13, further comprising providing, by the management processors, out-of-band security for the plurality of SoC nodes.

* * * * *